(12) United States Patent
Sugitani

(10) Patent No.: US 6,368,767 B1
(45) Date of Patent: *Apr. 9, 2002

(54) IMAGE FORMING MATERIAL AND PRODUCTION METHOD OF THE SAME, AND AN IMAGE FORMING APPARATUS

(75) Inventor: Syouichi Sugitani, Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,700

(22) Filed: Oct. 19, 1998

(30) Foreign Application Priority Data

Oct. 22, 1997 (JP) ............................................. 9-289807

(51) Int. Cl.⁷ .......................... G03C 11/12; B41M 5/24
(52) U.S. Cl. ...................... 430/258; 430/256; 430/291; 399/139; 399/318
(58) Field of Search ................................. 430/256, 291, 430/200, 201, 258; 399/139, 318

(56) References Cited

U.S. PATENT DOCUMENTS

| | | | |
|---|---|---|---|
| 3,787,210 A | * 1/1974 | Roberts | 430/201 |
| 3,945,318 A | * 3/1976 | Landsman | 430/201 |
| 3,978,247 A | * 8/1976 | Braudy et al. | 430/201 |
| 4,983,496 A | 1/1991 | Newell et al. | |
| 5,156,938 A | 10/1992 | Foley et al. | |
| 5,171,650 A | 12/1992 | Ellis et al. | |
| 5,256,506 A | 10/1993 | Ellis et al. | |
| 5,614,340 A | * 3/1997 | Bugner et al. | 430/41 |
| 5,693,447 A | * 12/1997 | Takeyama et al. | 430/201 |

FOREIGN PATENT DOCUMENTS

| | | |
|---|---|---|
| EP | 0 794 067 A1 | 9/1997 |
| JP | 55-132536 | 10/1980 |
| JP | 57-27788 | 2/1982 |
| JP | 57-103137 | 6/1982 |
| JP | 59-5447 | 1/1984 |
| JP | 59-105638 | 6/1984 |
| JP | 60-115153 | 6/1985 |
| JP | 64-56591 | 3/1989 |
| JP | 1-99887 | 4/1989 |
| JP | 4-506709 | 11/1992 |
| JP | 6-40163 | 2/1994 |
| JP | 6-43635 | 2/1994 |

OTHER PUBLICATIONS

Japanese Patent No. 06040635A; Tokunaga et al. abstract, Feb. 1994.*

Japanese Patent No. 06043635; Vogel et al. abstract, Feb. 1994.*

Anonymous: "Servo Scheme using Capacitive Sensing of Laser Ablated Marks on Magnetic Recording Disks"; IBM Technical Disclosure Bulletin, vol. 36, No. 2, Feb. 1993, pp. 57–60, XP000354260.

* cited by examiner

Primary Examiner—Janet Baxter
Assistant Examiner—Yvette M. Clarke
(74) Attorney, Agent, or Firm—Frishauf, Holtz, Goodman, Langer & Chick, P.C.

(57) ABSTRACT

An ablation image forming material is disclosed. In the image forming material the colorant particles are metal particles which are magnetized upon application of to magnetic force, a production method of the same, and an image forming apparatus.

5 Claims, 1 Drawing Sheet

IMAGE FORMING MATERIAL AND PRODUCTION METHOD OF THE SAME, AND AN IMAGE FORMING APPARATUS

FIELD OF THE INVENTION

The present invention relates to an image forming material and a production method of the same, and an image forming apparatus, and more specifically, to an image forming material having image information and information at the image formation, a production method of the same, and an image forming apparatus.

BACKGROUND OF THE INVENTION

Conventionally, recording methods are known in which light energy such as laser beams, etc. is focused and exposed onto a recording material to melt-deform a part of the recording material, or scatter, burn or evaporate-remove the same. These exhibit advantages such as a dry process which needs no processing solution such as a chemical solution, etc., and high contrast is obtained because only the light exposed part is scattered, burned or evaporate removed, and are utilized in optical recording materials such as resist materials, optical disks, etc., image forming materials which make themselves visible images, etc. Hereunder, these image forming methods are defined as ablation.

An image forming method employing the ablation is different from a thermally fusible type transfer image forming method in the following aspects. It is characterized in that the thermally fusible type transfer image forming method, on a support, is provided an image forming layer comprising a thermoplastic resin, wax, etc. having thermosoftening properties at relatively low temperatures, that is, a low melting point and a low softening point along with a colorant, and this image forming layer is heated imagewise directly or indirectly via a support, etc. to a temperature higher than the above-mentioned melting point and softening point to transfer only the melted part onto an image receiving sheet, while decreasing a bonding force between the support and the image forming layer. In this case, when the heated part of the image forming layer is cooled prior to transfer, reversible thermal properties are changed. Contrary to this, the image forming method employing ablation is clearly classified in terms of accompanying irreversible destruction of an image forming layer and accompanied deformation.

Examples of image forming methods employing ablation include methods, in which a resist pattern is formed upon photo-decomposing a binder resin subjected to a pattern exposure and the material thereof, described in Japanese Patent Publication Open to Public Inspection Nos. 59-5447, 59-105638, 62-115153, etc.; information recording in which a thin inorganic layer provided by an evaporation method is subjected to exposure to melt deform the layer, described in Japanese Patent Publication Open to Public Inspection Nos. 55-132536, 57-27788, 57-103137, etc.; materials to record information by removing a tinted binder layer employing light-heat conversion, described in Japanese Patent Publication Open to Public Inspection Nos. 64-56591, 1-99887, 6-40163, etc.; and image forming materials having an image forming layer comprising graphite or carbon black. Furthermore, image forming materials provided with an image forming layer comprising, as an indispensable component, a binder which can be decomposed by light heat conversion material which converts to heat energy upon absorbing laser beams are described in Japanese Patent Publication Open to Public Inspection under PCT Application No. 4-506709, Japanese Patent Publication Open to Public Inspection No. 6-43635, U.S. Pat. Nos. 5,156,938, 5,171,650, 5,256,506, etc., and of these, those disclosed in Japanese Patent Publication Open to Public Inspection under PCT Application No. 4-506709, and U.S. Pat. Nos. 5,156,938, 5,171,650, and 5,256,506 are in which an image forming layer in which the binder resin is decomposed and scattered is received employing a member to be transferred.

However, when conventional ablation materials are employed, the operator should respectively write in the ablation material or other recording medium, at storage, the type of image data employed by a material subjected to image formation and accompanied information to the image data at image formation, etc. When the record is made on the ablation material directly, it is necessary to provide a layer suitable for writing or recording additionally, or to provide a recording portion specifically.

In case that the ablation recording material is provided, before the exposure, with a peelable layer which is released after exposure to remove the exposed portion of the image forming material when an image is formed by removing the image forming layer at exposed portion, another problem has been arisen. That is, since the whole surface of the ablation material is the image forming area, the area is so broad that binding force between the support and image forming layer is reduced when the whole surface is exposed. In case that the ablation material is wound up on a drum and the ablation material is exposed by laser light etc. on the rotating drum, the peelable layer and the exposed portion of the image forming layer are removed during the drum rotation.

SUMMARY OF THE INVENTION

An object of the present invention is to provide an image forming method which enables to record the type of the image data employed for the image formation or an accompanying information concerning to the image data, and later to recognize the type of image data employed by a material subjected to image formation without providing recording layer or recording portion suitable to recording or writing specifically.

The other object is to provide an image forming method which enables to record data effectively and to prevent the peelable layer peeling off during the rotation of the drum in case that the exposed portion of the image forming layer is removed by providing a peelable layer before exposure and releasing the peelable layer after exposure when image is formed by removing the image forming layer at the exposed portion.

The present invention and preferable embodiments will be described below.

The image forming method comprises steps of;
exposing image forming area of a recording material comprising, provided on a support, an image forming layer which contains colorant particles dispersed into a binder, with high intensity energy light imagewisely,
removing the exposed portion of the image forming layer to form an image, recording a magnetic information on the image forming layer at non-image-forming area of the recording material.

In this method the colorant particles are ferromagnetic powder having not less than 100 Oe, content of the colorant particles contained in the above-mentioned image forming layer are between 20 and 90 weight percent and the layer thickness of the image forming layer is between 0.1 and 3.0 $\mu$m.

The recording material comprises a peelable layer and the exposed portion of the image forming layer is removed by releasing the peelable layer after exposing with intensity energy light.

The recording material is wind on a drum and exposing image forming area of the recording material with high intensity energy light is conducted at the time of the drum rotates.

The circumference speed of the rotating drum is preferably not less than 10 m/sec at image exposing.

The recording material preferably comprises a protective layer, provided on the image forming layer, having a thickness of 0.05–1.0 µm.

The surface roughness of the protective layer is preferably 0.1–0.05 µm.

The surface roughness of the recording material is preferably 0.005–0.05 µm.

The image forming material is preferably subjected to orientation treatment after providing the image forming layer during the preparation.

The orientation treatment is preferably a non-orientation treatment.

DETAILED DESCRIPTION OF THE INVENTION

Figure 1:
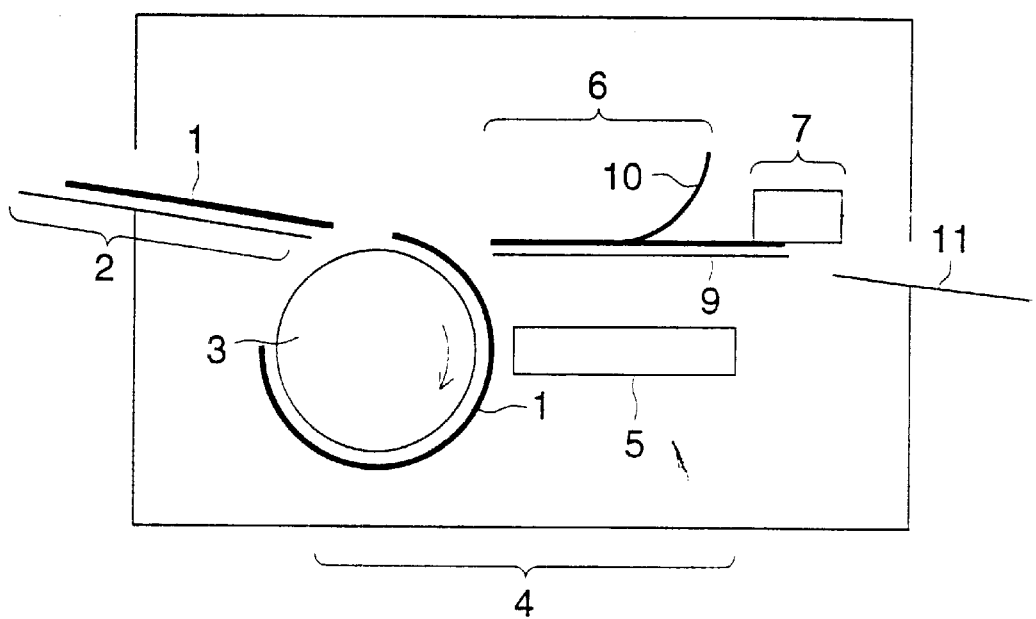
FIG. 1 is a schematic view showing the interior of the image forming apparatus of the present invention.

The present invention will now be explained in detail below.

<Image Forming Material>

As the embodiment of the image forming material of the present invention, the basic structure is such that a transfer receiving member having a transfer receiving layer is provided on an exposure sheet having a support comprising thereon an image forming layer, and other than these, may be provided an interlayer between the first support and the image forming layer, and on the image forming layer, a protective layer to protect an image. Furthermore, on the back surface of each support, may be provided a back treatment layer to minimize electrostatic charging and to obtain a matted surface.

Support

Supports include transparent supports such as each resin film of polyethylene terephthalate, polybutylene terephthalate, polyethylene naphthalate, polycarbonate, polyvinyl chloride, polyethylene, polypropylene, polystyrene, nylon, aromatic polyamide, polyether ether ketone, polysulfone, polyether sulfone, polyimide, polyether imide, etc. and further, resin film composed of at least two laminated layers of the above-mentioned resins.

In the present invention, the support is a support which can transmit not less than 50% of light having exposure light source wavelengths and is preferred, in terms of dimensional stability, which is stretched into film and thermally set. In the range of the added amount which does not degrade the effects of the present invention, may be incorporated fillers such as titanium oxide, zinc oxide, barium sulfate, calcium carbonate, etc. The thickness of the transparent support is between about 10 and about 500 µm and preferably between 25 and 250 µm.

Image Forming Layer

The image forming layer of the present invention is fundamentally composed of colorant particles and a binder bearing these.

Colorant Particles

Ferromagnetic powder particles employed as the colorant particles is required to exhibit not less than 100 Oe of coercive force. The particles exhibiting not more than 100 Oe of the coercive force, when subjected to application of magnetic force, is not magnetized to enable no recording. In order to let ferromagnetic powder exhibit the coercive force, the coercive force can be readily obtained by shaping the ferromagnetic powder into needles.

The coercive force of the colorant particles is preferably 700 oe, and the coercive force is preferably 1200 Oe in case that the colorant particles are ferromagnetic metal powder.

The amount of the colorant particles incorporated into the image forming layer is preferably between 20 and 90 weight percent. When the amount is not more than 20 percent, the coercive force of the entire image forming layer is low to enable no magnetic recording. On the other hand, when the amount is not less than 90 weight percent, the dispersion in a binder becomes difficult and the image forming layer cannot be provided by coating.

The thickness is preferably between 0.1 and 3.0 µm. The thickness of not more than 0.1 is not preferred due to the decrease of the coercive force of the image forming layer. Furthermore, when the thickness becomes not less than 3.0 µm a coated layer is not destroyed at image formation and an image is not formed due to no removal of the energy irradiated part of the image forming layer.

Thickness of the image forming layer is more preferably 0.3–3.0 µm. It is preferable to employ ferromagnetic powder having Hc of not less than 1600 Ee as the colorant and to give saturation magnetic flux density (Bm) being not less than 3000 Gauss.

Furthermore, when the image forming layer is provided on a support by coating, magnetic powder particles may be subjected to orientation or may be subjected to random orientation through performing a non-orientation treatment on the magnetic powder particles. In the present invention, an orientation treatment is performed by passing the particles through a magnetic field exhibiting not less than 100 gauss. The magnetic field is preferably between 100 and 1,000 gauss. When the magnetic field becomes not more than 100 gauss, the orientation treatment is not fully carried out, and when magnetic force is applied, the particles are hardly magnetized to eliminate recording over the elapse of time due to weak magnetic recording. Furthermore, when the applied magnetic force exceeds 10,000 gauss, the coating surface is roughened at orientation and an image exhibiting high resolving power can be obtained and magnetic recording becomes easy. The orientation treatment can be carried out in such a manner that, for example, after coating, the resulting is passed through a magnetic field generated by a horizontal orientation magnet, a vertical orientation magnet, or a non-orientation magnet followed by being introduced into a dryer and being dried by blowing heated air from nozzles provided upper and lower sides. The applied magnetic field generated by the horizontal orientation magnet, vertical orientation magnet, or non-orientation magnet is between about 20 and about 10,000 gauss.

The colorant particles of the present invention include ferromagnetic iron oxide powder, ferromagnetic metal powder, cubic crystal plate-shaped powder, hexagonal crystal plate-shaped powder, etc. Of these, the ferromagnetic metal powder can be preferably employed.

As ferromagnetic iron oxides, can be listed $\gamma\text{-Fe}_2\text{O}_3$, $\text{Fe}_3\text{O}_4$ or these which are intermediates of the oxides and are represented by $\text{FeO}_x$ ($1.33 < X < 1.50$).

Ferromagnetic metal powders include those of metal magnetic powders, etc. composed of, as a main component, in addition to Fe and Co, Fe—Al series, Fe—Al—Ni series, Fe—Al—Zn series, Fe—Al—Co series, Fe—Al—Ca series, Fe—Ni series, Fe—Ni—Al series, Fe—Ni—Co series, Fe—Ni—Zn series, Fe—Ni—Mn series, Fe—Ni—Si series, Fe—Ni—Si—Al—Mn series, Fe—Ni—Si—Al—Zn series, Fe—Ni—Si—Al—Co series, Fe—Al—Si series, Fe—Al—Zn series, Fe—Co—Ni—P series, Fe—Co—Al—Ca series, Ni—Co series, Fe, Ni, Co, etc. Of these, Fe series metal powder is preferred and include, for example, iron oxide series magnetic powders containing Co such as Co containing $\gamma$-Fe$_2$O$_3$, Co adhered $\gamma$-Fe$_2$O$_3$, Co containing Fe$_3$O$_4$, Co adhered Fe$_3$O$_4$, Co containing magnetic FeO$_x$ (4/3<X<3/2) powders, etc. Furthermore, from a view point of corrosive resistance and dispersibility, of Fe series metal powders, are preferred Fe—Al series ferromagnetic powders such as those of Fe—Al series, Fe—Al—Ca series, Fe—Al—Ni series, Fe—Al—Zn series, Fe—Al—Co series, Fe—Ni—Si—Al—Co series, Fe—Co—Al—Ca series, etc. Furthermore, of these, are preferred those having a structure such that the content ratio of Fe atoms to Al atoms contained in ferromagnetic powder is Fe:Al=100:1 to 100:20 in terms of the ratio of the number of atoms and the content ratio of Fe atoms to Al atoms which are present in the surface region of the analytical depth of not more than 100 Å obtained by ESCA (X-ray photoelectric spectral analysis method) on ferromagnetic powder is Fe:Al:=30:70 to 70:30 in terms of the ratio of the number of atoms, or at least one of Fe atom and Ni atom, Al atom and Si atom, and Co atom and Ca atom is incorporated into ferromagnetic powder, the content of Fe atoms is not less than 90 atom percent, the content of Ni atoms is between 1 and 10 atom percent, the content of Al atoms is between 0.1 and 5 atom percent, the content of Si atoms is between 0.1 and 5 atom percent, the content (when both atoms are contained, the total of both) of Co atoms or Ca atoms is between 0.1 and 13 atom percent, and the content ratio of Fe atoms, Ni atoms, Al atoms, and Si atoms to Co atoms and/or Ca atoms, which are present in the surface region of the analytical depth of not more than 100 Å obtained by ESCA (X-ray photoelectric spectral analysis method) on ferromagnetic powder, is Fe:Ni:Al:Si:(Co and/or Ca)=100:(not more than 4):(10 to 60):(19 to 70):(20 to 80).

Further, the shape of the ferromagnetic powder exhibits a long axis of not more than 0.30 $\mu$m and preferably not more than 0.20 $\mu$m. Such ferromagnetic powder improves the surface properties of a colorant layer.

Hexagonal crystal plate-shaped powders include hexahedron crystal system ferrites such as barium ferrite, strontium ferrite, etc. and a part of iron element may be replaced with other atoms (Ti, Co, Zn, In, Mn, Ge, Hb, etc.). Such ferrites include those described in IEEE Trans. on MAG, page 18, 16 (1982). Of these, as the example of the barium ferrite magnetic powder, is illustrated one, in which the average particle diameter (length of the diagonal of the plate surface of hexagonal crystal system ferrite) in which a part of Fe is substituted with at least Co and Zn, is between 400 and 900 Å and a plate ratio (value obtained by dividing the diagonal length of the plate surface of hexagonal crystal system ferrite by the plate thickness) is between 2.0 and 10.0. Furthermore, a part of Fe of the barium ferrite magnetic powder may be substituted with transition metals such as Ti, In, Mn, Cu, Sn, etc.

Production methods of cubic crystal system magnetic powder include, for example, a glass crystallization method in which the oxide and carbonate of each atom necessary to form a desired barium ferrite are fused with a glass forming material such as boric acid; the resulting fused composition is quickly cooled to form glass followed by thermally treating the resulting glass at the predetermined temperature to deposit desired barium ferrite crystal powder, and finally, the glass component is removed by a thermal treatment, and in addition, a coprecipitation-sintering method, a water heat synthesis method, a flux method, an alkoxide method, a plasma jet method, etc.

Binder Resin

Any binder resin can be employed without particular limitation, if those can sufficiently bear colorant particles which can absorb light with wavelengths of an exposure light source.

As binders such as above, polyurethane, polyester, and vinyl chloride series resins such as vinyl chloride series copolymers are representative. These resins preferably comprise repeated unit having at least one polar group selected from —SO$_3$M, —OSO$_3$M, —COOM and —PO(OM$_1$)$_2$ (wherein M represents a hydrogen atom or an alkali metal, and M$_1$ represents a hydrogen atom, an alkali metal or an alkyl group). By employing resins which are substituted with a polar group such as above, the dispersibility of the magnetic powder can be improved. Further, the content ratio of the polar group in each resin is between about 0.1 and about 8.0 mole percent and preferably between 0.2 and 6.0 mole percent. Binder resins can be employed individually or in combinations of not less than two.

Vinyl chloride containing a polar group can be synthesized, for example, by an addition reaction of a hydroxyl group-containing resin such as a vinyl chloride-vinyl alcohol, etc. with a compound having a polar group and a chlorine atom such as Cl—CH$_2$CH$_2$SO$_3$M, Cl—CH$_2$CH$_2$OSO$_3$M, Cl—CH$_2$CO$_2$M, Cl—CH$_2$P(=O)(OM$_1$)$_2$, etc.

Furthermore, in order to enhance the thermal stability of the binder resin, the introduction of an epoxy group into a vinyl chloride series copolymer is preferred. In this case, the content ratio of the repeated unit having the epoxy group in the copolymer is between about 1 and 30 mole percent and preferably between 1 and 20 mole percent, and as monomers to introduce the epoxy group, can be listed glycidyl acrylate, etc.

Polyester having a polar group can be synthesized by a dehydration condensation reaction of a polyol with a polybasic acid having a polar group on its part. Polybasic acids having a polar group include 5-sulfoisophthalic acid, 2-sulfoisophthalic acid, 4-sulfoisophthalic acid, 3-sulfophthalic acid, 5-sulfoisophthalic acid dialkyl, 2-sulfoisophthalic acid dialkyl, 4-sulfoisophthalic acid dialkyl, 3-sulfophthalic acid dialkyl, and alkali metal salts thereof, etc. Polyols include trimethylolpropane, hexanetriol, glycerin, trimethylolethane, neopentyl glycol, pentaerythritol, ethylene glycol, propylene glycol, 1,3-butanediol, 1,6-hexanediol, diethylene glycol, cyclohexanedimethanol, etc.

Polyurethane having a polar group can be synthesized by allowing polyol to react with polyisocyanate. Specifically, it is synthesized employing, as a raw material, polyester polyol prepared by reacting polyol with a polybasic acid having a polar group on one part thereof. Furthermore, as polyisocyanates, can be listed diphenylmethane-4,4'-diisocyanate-2,4-tolylenediisocyanate, 2,6-tolylenediisocyante, 1,3-naphthalenediisocyanate, lysineisocyantemethyl ester, etc. As another synthesis method of the polyurethane having a polar group, an addition reaction of polyurethane with Cl—CH$_2$CH$_2$SO$_3$M, Cl—CH$_2$CH$_2$OSO$_3$M, Cl—CH$_2$CO$_2$M, Cl—CH$_2$P(=O)(OM$_1$)$_2$ etc. is effectively employed.

As other binder resins, may be employed, in combination, vinyl chloride series resins such as vinyl chloride-vinyl acetate copolymers, etc., olefin series resins such as butadiene-acrylonitrile copolymers, etc., polyvinyl acetal series resins such as polyvinyl butyral, etc., cellulose resins such as nitrocellulose, etc., styrene series resins such as styrene-butadiene copolymers, etc., acrylic series resins such as polymethyl methacrylate etc., polyamides, phenol resins, epoxy resins, phenoxy resins, etc.

Other Additives

Into the image forming layer, may be incorporated, in the range which does not deteriorate the effects of the present invention, additives such as lubricants, durability enhancing agents, dispersing agents, antistatic agents, fillers, hardeners, etc.

Lubricants include fatty acids, fatty acid esters, fatty acid amides, (modified) silicone oil, (modified) silicone resins, fluororesins, fluorinated carbon, etc. Durability enhancing agents include polyisocyanates, etc. Dispersing agents include fatty acids having from 12 to 18 carbon atoms such as lauric acid, stearic acid, etc. and the amides thereof, alkali metal salts, alkali earth metal salts; polyalkylene oxide alkyl phosphates, lecithin, trialkylpolyolefinoxy quarternary ammonium salts; azo series compounds having a carboxyl group and a sulfone group, and antistatic agents include cationic series surface active agents, anionic series surface active agents, nonionic surface active agents, polymer antistatic agents, fine electrically conductive particles, in addition, compounds described in "11290 no Kagaku Shohin (11290 Chemical Products)", pages 875 to 876 published by Kagakukogyo Nippousha.

Fillers

Fillers include inorganic fillers such as carbon black, graphite, $TiO_2$, $BaSO_4$, ZnS, $NgCO_3$, $CaCO_3$, ZnO, CaO, $WS_2$, $MOS_2$, MgO, $SnO_2$, $Al_2O_3$, $\alpha$-$Fe_2O_3$, $\alpha$-FeOOH, SiC, $CeO_2$, BN, SiN, MoC, BC, WC, titan carbide, corundum, artificial diamond, garnet, silicic anhydride, diatomite, doromite, etc., and organic fillers such as polyethylene resin particles, fluororesin particles, guanamine resin particles, acrylic resin particles, silicone resin particles, melamine resin particles, etc.

Furthermore, as the fillers, can be listed inorganic or organic resin particles which also work as releasing agents. As such fine inorganic particles, can be listed silica gel, calcium carbonate, titanium oxide, acid clay, activated clay, alumina, etc. As fine organic particles, can listed resin particles such as fluororesin particles, guanamine resin particles, acrylic resin particles, silicone resin particles, etc. The added amount of these inorganic or organic resin particles, though varied in accordance with the specific gravity, is preferably between 0.1 and 70 weight percent.

Hardeners

As hardeners, those which can harden an image forming layer can be employed without any limitation, and as such hardeners, can be listed, for example, polyisocyanate, etc., which are employed during the synthesis of polyurethane in the above-mentioned binder.

Through hardening an image forming layer with the addition of such a hardener, the durability of a formed image is enhanced and furthermore, the background stain of the part which generates ablation can be minimized. The added amount of these additives is between 0 and about 20 weight percent and preferably between 0 and 15 weight percent.

Furthermore, the image forming layer may be composed of a single layer or multilayer comprised of different compositions. When constituted with the multilayer, it is preferred to add, to the layer adjacent to a support, the larger amount of a dye which can absorb light having the wavelengths of an exposure light source. Furthermore, it may be allowed to add, to the layer farther from the support, a dye which can absorb light having wavelengths other than those of exposure light source.

The surface roughness of the image forming layer, taking the magnetic writing and reading practice, is preferably 0.005–0.05 $\mu$m and more preferably 0.01–0.02 $\mu$m. In case that a protective layer is not provided on the image forming layer, the surface roughness of the image forming layer, taking the magnetic writing and reading practice, is preferably 0.005–0.05 $\mu$m and more preferably 0.01–0.02 $\mu$m.

The surface roughness can be measured by using contact type or non-contact type of surface roughness meter, concretely an apparatus of WYKO. Matting agent such as filler may be contained in the image forming layer so aw to adjust the surface roughness to the predetermined value.

Protective Layer

The protective layer is fundamentally composed of a binder resin. As far as the object of the present invention is accomplished, additives may optionally be added. Examples of such resins include Eriteru UE3690 manufactured by Unitika Ltd., and YD-8125 and YDF-8170 manufactured by Toto Kasei Co., Ltd. as polyester resins, Dianar BR-50, BR-52, BR-73, BR-75, BR-77, BR-80, BR-82, BR-83, BR-85, BR-87, BR-88, BR-95, BR-100, BR-108 manufactured by Mitsubishi Rayon Co., Ltd. as acrylic resins, Bairon UR-1400 manufactured by Toyo Boseki Co., Ltd. as polyurethane resins, PKHC, PKHH, and PKHJ manufactured by Phenoxy Associate Co. as phenoxy resins, and Phenotot YP-50 and YP-50S as phenoxy resins, Esureku KDS-1, KS-5, BX-1, BX-2, BX-5 and BX-55 manufactured by Sekisui Kagaku Kogyo Co., Ltd. as polyvinyl acetal series resins, etc.

The protective layer enhances the durability of image forming layer and storage stability of image, and further, reduces the deterioration of magnetic information in case of repeated magnetic reading and writing. Consequently durability can be obtained in repeated use.

Furthermore, a functional group which can be subjected to cross linking reaction with the hardener in a binder resin preferably is one which can be subjected to cross linking reaction employing a cross linking agent in an image forming layer. For example, when the cross linking agent in the image forming layer is an isocyanate compound, the binder resin preferably comprises a hydroxyl group, while when the cross linking agent in the image forming layer is an amine series compound, the binder resin preferably comprises an epoxy group or a ketone part.

In the present invention, when an image protecting layer is coated on an image forming layer, at least one of coating solvents, used as a mixture of one or in combinations of two or more, employed for an image forming layer coating composition is preferably the same as at least one of coating solvents employed for the image protecting layer coating composition due to improvement in durability. As the solvents, can be employed alcohols (ethanol, propanol, etc.), cellosolves (methyl cellosolve, ethyl cellosolve), aromatics (toluene, xylene, chlorobenzene, etc.), ketones (acetone, methyl ethyl ketone, etc.), ester series solvents (ethyl acetate, butyl acetate, etc.), ethers (tetrahydrofuran, dioxane, etc.), halogen series solvents (chloroform, dichlorobenzene, etc.), amide series solvents (for example, dimethylformamide, N-methylpyrrolidone, etc.), and the like.

Furthermore, when the image protecting layer is coated onto the image forming layer, the image protecting layer is preferably coated after the binder is subjected to cross linking treatment employing a cross linking agent because the resolving power and abrasion resistance are improved.

The protective layer may be provided before or after the image formation. In the latter the protective layer is provided by means of lamination after removing exposed portion of image forming layer. In the former it may be so designed that both of exposed portions of the image forming layer and the protective layer are removed, or that exposed portion of the image forming layer is removed by removing the whole protective layer which also serves as releasing layer.

The thickness of the protecting layer, taking the magnetic writing and reading practice, is preferably 0.05–1.0 μm and more preferably 0.1–0.3 μm.

The protective layer is preferably 0.01–0.3 μm becase of easy rewriting of the magnetic information in case that the the thickness of the image forming layer being 0.1–1.5 μm. The magnetic information can be written even when the thickness of the protective layer is 0.3–0.5 μm in case that the thickness of the image forming layer is 1.5–3.0 μm.

The surface roughness of the protecting layer, taking the magnetic writing and reading practice, is preferably 0.01–0.5 μm and more preferably 0.01–0.2 μm.

The surface roughness can be measured by using contact type or non-contact type of surface roughness meter. Concrete example is Non-contact 3 dimensional surface analyser, RST/PLUS product of WYKO COrporation. Matting agent such as filler may be contained in the image forming layer so aw to adjust the surface roughness to the predetermined value. Content of the matting agent is preferably not more than 1 weight %.

Method to Form Image Forming Layer

The image forming layer is formed in such a manner that, for example, colorant particles, binder resins, and, if desired, lubricants, dispersing agents, antistatic agents, fillers, hardeners, etc. are mix-kneaded with solvents to prepare highly concentrated coating composition and the resulting concentrated coating composition is then diluted to prepare a coating composition, and the resulting coating composition is then coated onto a support and dried.

Any solvent can optionally employed as far as the object of the present invention is accomplished. As solvents, can be employed alcohols (ethanol, propanol, etc.), cellosolves (methyl cellosolve, ethyl cellosolve), aromatics (toluene, xylene, chlorobenzene, etc.), ketones (acetone, methyl ethyl ketone, etc.), ester series solvents (ethyl acetate, butyl acetate, etc.), ethers (tetrahydrofuran, dioxane, etc.), halogen series solvents (chloroform, dichlorobenzene, etc.), amide series solvents (for example, dimethylformamide, N-methylpyrrolidone, etc.), and the like. Furthermore, for mix-kneading and dispersing the image forming layer components, can be employed a two-roll mill, a three-roll mill, a ball mill, a pebble mill, a coball mill, a tron mill, a sand mill, a sand grinder, Sqefvari atleiter, a high speed impeller dispersing device, a high speed stone mill, high speed impact mill, a disper, a high speed mixer, a homogenizer, an ultrasonic dispersing device, an open kneader, a continuous kneader, and the like.

The formation of the image forming layer on a support is carried out by coating and drying, employing, for example, an extrusion coater utilizing an extrusion system. In the present invention, in order to obtain the uniform surface of an image forming layer and enhance the coating layer durability through decreasing void ratio, a calender treatment is carried out. The calender treatment is carried out, for example, by leading a support having a dried image forming layer to a super-calender device wherein it is subjected to the calender treatment.

As calender conditions, the temperature is preferably between 60 and 120° C. and more preferably between 70 and 110° C., and the pressure is preferably between 100 and 500 kg/cm in line pressure and more preferably between 200 and 400 kg/cm. When both temperature and pressure become lower than the lower limits, the strength of the coating layer is not sufficient to decrease the resolving power of an image. Furthermore, when both exceed the upper limits, the cracks on the coating layer are caused and products cannot be introduced into market. The conveyance speed is between 20 and 1,000 m/minute and drying is carried out at a temperature of 30 to 120° C. for about 0.1 to about 10 minutes. In any case, in order to decease a remaining ratio, an image forming material is preferably subjected to treatment under pressure so that the void ratio of the image forming layer becomes not more than 30% and preferably not more than 20%.

As the calender condition, taking the magnetic writing and reading practice, temperature is preferably 90–120° C. and line pressure is 250–400 kg/cm. Calender treatment may be subjected twice or more in this condition.

Volume percent as described herein denotes a value obtained by the method mentioned below.

Volume percent=Theoretical volume percent of metal atom containing particle/(Theoretical density of image forming layer/Measured density of image forming layer)

Furthermore, when layers other than the image forming layer are provided, each layer may be repeatedly coated and dried. However, each layer may be subjected to multilayer coating employing a wet-on-wet system and drying. In that case, coating may be carried out employing combinations of an extrusion coater with a reverse roll, a gravure roll, an air doctor coater, a blade coater, an air knife coater, a squeeze coater, a kiss coater, a cast coater, a spray coater, etc.

Further, in the multilayer coating employing the wet-on-wet system, because an upper layer is coated onto a lower layer which is being in the wet state, adhesion between the upper layer and the lower layer is improved.

<Image Forming Method>

Image exposure is carried out onto an image forming material provided an image forming layer on a support while employing high intensity energy light. The image exposure may be carried out either through the support or onto the image forming layer.

Any high intensity energy light can be employed for the image exposure without any limitation, if an exposed part can be removed employing any method. Of the high intensity energy light, in order to obtain high resolving power, an electromagnetic wave which enables focusing of an energy applied area, especially ultra violet ray, visible light and infrared ray having wavelengths between 1 nm and 1 mm are preferred. As light sources which can apply such high intensity energy light, can be listed, for example, laser, light emitting diodes, xenon flash lamps, halogen lamps, carbon arc, metal halide lamps, tungsten lamps, quartz mercury lamps, etc. In this case, applied energy can be optionally selected while adjusting, depending on types of image forming materials, exposure distances, time, and intensity.

When the above-mentioned high intensity energy light is employed to carry out simultaneous exposure, the exposure may be carried out while overlapping a mask material in which a negative pattern of a desired exposure image is formed employing a light shielding material.

When employing an array type light source such as a light emitting diode array, etc. or controlling exposure employing an optical shutter member such as liquid crystal. PLZT, etc., it is possible to carry out digital exposure corresponding to image signals. In this case, it is possible to carry out direct writing without employing a masking materiel.

However, because in this method, the optical shutter member is required in addition to the light source, a laser is preferably employed in the case of digital exposure.

When laser light is employed as a light source, it is possible to narrow the light to a beam and to form a latent image employing scanning exposure corresponding to image data. Furthermore, when the laser is employed as a light source, an exposed area is readily minimized to a fine size to make it possible to form an image exhibiting high resolution power.

As laser beam sources employed in the present invention, can be listed general solid lasers well known such as a ruby laser, a YAG laser, a glass laser, etc.; gas lasers such as a He—Ne laser, an Ar ion laser, a Kr ion laser, a $CO_2$ laser, a CO laser, a He—Cd laser, a $N_2$ laser, an excimer laser, etc.; semiconductor lasers such as an InGaP laser, an AlGaAs laser, a GaAsP laser, an InGaAs laser, an InAsP laser, a $CdSnP_2$ laser, a GaSb laser, etc.; chemical lasers, dye lasers, etc. Of these, in order to enable the efficient removal of an exposed part, the laser having a wavelength of 750 to 1,200 nm is preferred from the aspect of sensitivity because of the efficient converting capability of light energy to heat energy. Furthermore, of these, the laser emits higher illumination beam is preferred when lasers emit beams having the same wavelength.

In the present invention, after high intensity energy light is exposed imagewise onto an image forming layer, an image formation is carried out by removing an exposed part which is subjected to decrease in a bonding force between the support and the image forming layer. The decrease in the bonding force as described herein includes phenomena such as perfect scattering of an image forming layer due to physical or chemical changes, partial destruction and/or scattering of an image forming layer, physical or chemical changes only adjacent to a support, etc.

A method to remove an exposed part which is subjected to a decrease in the bonding force between the support and the image forming layer is in such a manner that a roller exhibiting magnetism is arranged in contact with or near an image forming layer and after exposure, the image forming layer is passed through the roller and removed. At the time, there may be no relative speed of the image forming layer in respect to the magnetic roller or the relative speed may be given through reversibly rotating the magnetic roller.

A brush instead of the magnetic roller is arranged so as to be in contact with the image forming layer, and after image exposure, the brush is passed through the image forming layer followed by removing the layer. At the time, it is preferred that the relative speed is generated between the image forming layer and the magnetic brush.

Furthermore, the image forming layer can be removed employing suction caused by evacuation. The specific gravity of the image forming layer employed herein is preferably greater than that of the protective layer. When the specific gravity is small, scattering widely results by exposure to cause image stain. Furthermore, the specific gravity is preferably between 1.5 and 9. Unnecessary scattering of image forming materials due to exposure is effectively minimized with high residual density.

The exposed portion of the image layer may be removed together with the protective layer or the releasing layer stacked with, by removing the protective layer or the releasing layer in case that each the protective layer or the releasing layer is provided previously.

Further, the magnetic adsorption, brush, and suction as mentioned above are preferably employed in combinations. These enables the image formation while exhibiting high sensitivity, high resolution, and minimum residual density.

It is preferable that the ablation recording material is previously provided with an image forming area where exposure is made and non-image-forming area where exposure is not made, in case that the ablation recording material is provided with a peelable layer which is released after exposure to remove the exposed portion of the image forming material when an image is formed by removing the image forming layer at exposed portion, and the ablation material is wound up on a drum and the ablation material is exposed by laser light etc. on the rotating drum. According to the image forming area and the non-image-forming area the peelable layer etc. is avoided to peel off during the drum rotation. The non-image forming area is provided preferably at the circumference of the recording material, especially the whole part of the circumference of the recording material. It is preferable so designed that an information is recorded magnetically at the image forming layer of the non-image-forming area in case that the non-image-forming area is provided.

It is preferable to expose by laser with making drum rotation of circumferential speed at not less than 10 m/sec. Magnetic information to be recorded includes client's information such as condition of a disease, history of diseases, name and date when used in medical area, image recording information such as sensitivity and laser intensity, or image information such as newspaper, advertisement or poster, or image itself with reduced resolving power.

The interior of the image forming apparatus of the present invention is elucidated with reference to FIG. 1. The image forming apparatus of the present invention is composed of an image forming material loading section 2, an exposure section 4, a peeling section 6, and a magnetic recording section 7. An image forming material 1 is loaded to the image forming material loading section 2, and information (for example, the type of a light source, energy intensity, etc.) at the image formation is input. The image forming material 1 is conveyed to the exposure section 4; automatically loaded into a drum 3, and subjected to exposure employing a laser under input conditions. The exposed image forming material 1 is conveyed to the peeling section 6, therein, a material 10 having a peelable layer is peeled, and a material 9 having an image forming layer is conveyed to the magnetic recording section 7. The information recorded material is ejected from an ejecting outlet 11. The resulting image and the image forming material having the information at the image formation are loaded to a reading device for magnetic recording and the display and printing of the content of the magnetic recording are carried out. If desired, the printed data are adhered on a bag to store one part or entire image.

EXAMPLES

The present invention is detailed below with reference to examples. In the following, "parts" are by "weight parts as an effective component", unless otherwise specified.

Example 1

<Image Forming Material>

Image forming materials were prepared employing the support, 8 types of image forming layers and peelable layers shown below. The constitutions of the prepared image forming materials are shown in Table 1.

Support

Transparent polyethylene terephthalate film, which is prepared in such a manner that the laminated surface of an image forming layer is subjected to corona discharge treatment, and on the back side of the support, a backing layer is provided by coating a composition prepared by mixing an organic solvent, a polyester resin, a silica resin filler and an antistatic agent.

Image Forming Layer

Samples were prepared by coating the 8 types of image forming layers mentioned below, at the thickness shown in Table 1.

Image Forming Layer 1

Compositions mentioned below were mix-kneaded employing a Henschel mixer and a sand mill; an image forming layer coating composition containing colorant particles was prepared, and coated onto a support employing an extrusion coating system. Thereafter, the resulting coating was subjected to orientation in an oven at 2,000 gauss followed by drying, and was then subjected to calender treatment under a pressure of 300 kg/cm to form Image Forming Layer 1. Content of the colorant particles in the image forming layer 1 was 83.3 wt %.

| | |
|---|---|
| Fe-Si-Al-Ni-Co series ferromagnetic metal powder (colorant particles) (number ratio of atoms, Fe:Si:Al:Ni:Co = 100:1:4:3:5 (total), average long axis diameter: 0.14 µm, needle ratio 5, Hc: 1760 Oe, σs: 120 emu/g, BET: 59 m²/g)) | 100 parts |
| Vinyl chloride series resin containing potassium sulfonate (MR-110, manufactured by Nippon Zeon Co., Ltd.) | 6 parts |
| Polyurethane resin containing sodium sulfonate (UR-8300 manufactured by Toyo Boseki Co., Ltd.) | 6 parts |
| Stearic acid | 1 part |
| Myristic acid | 1 part |
| Butyl stearate | 1 part |
| Polyisocyanate compound (Coronate L manufactured by Nippon Polyurethane Kogyo Co., Ltd.) | 5 parts |
| Cyclohexanone | 100 parts |
| Methyl ethyl ketone | 100 parts |
| Toluene | 100 parts |

Image Forming Layer 2

Compositions mentioned below were mix-kneaded employing a Henschel mixer and a sand mill; an image forming layer coating composition containing colorant particles was prepared, and coated onto a support employing an extrusion coating system. Thereafter, the resulting coating was subjected to orientation in an oven at 2,000 gauss followed by drying, and was then subjected to calender treatment under a pressure of 300 kg/cm to form Image Forming Layer 2.

Content of the colorant particles in the image forming layer 2 was 83.3 wt %.

| | |
|---|---|
| Co-γ series ferromagnetic powder (colorant particles) ($Fe^{2+}/Fe^{3+}$ = 0.35, Hc: 800 Oe, needle ratio 7, BET: 56 m²/g) | 100 parts |
| Vinyl chloride series resin containing potassium sulfonate (MR-110, manufactured by Nippon Zeon Co., Ltd.) | 6 parts |
| Polyurethane resin containing sodium sulfonate (UR-8300 manufactured by Toyo Boseki Co., Ltd.) | 6 parts |
| Stearic acid | 1 part |
| Myristic acid | 1 part |
| Butyl stearate | 1 part |
| Polyisocyanate compound (Coronate L manufactured by Nippon Polyurethane Kogyo Co., Ltd.) | 5 parts |
| Cyclohexanone | 100 parts |
| Methyl ethyl ketone | 100 parts |
| Toluene | 100 parts |

Image Forming Layer 3

Compositions of Image Forming Layer 1 were mix-kneaded employing a Henschel mixer and a sand mill; an image forming layer coating composition containing colorant particles was prepared, and coated onto a support employing an extrusion coating system. Thereafter, the resulting coating was subjected to non-orientation treatment followed by drying, and was then subjected to calender treatment under a pressure of 300 kg/cm to form Image Forming Layer 3. In the non-orientation treatment, during 6 steps, in each step, a magnetic filed was subjected to an alternating current and in respect to the conveying direction, the magnetic field was decreased in the sequence of 2000/1000/500/250/100/50.

Image Forming Layer 4

In Fe—Si—Al—Ni—Co series ferromagnetic metal powder (colorant particles), the same as Image Forming Layer 1 except that the needle ratio was altered to 2 and Hc was altered to 100 Oe.

Image Forming Layer 5

In Fe—Si—Al—Ni—Co series ferromagnetic metal powder (colorant particles), the same as Image Forming Layer 1, except that the needle ratio was altered to 8 and Hc was altered to 2500 Oe.

Image Forming Layer 6

In Fe—Si—Al—Ni—Co series ferromagnetic metal powder (colorant particles), the same as Image Forming Layer 1, except that the needle ratio was altered to 1 and Hc was altered to 80 Oe.

Content of the colorant particles in each of the image forming layers 3–6 was 83.3 wt %.

Image Forming Layer 7

The same as Image Forming Layer 1, except that in Image Forming Layer 1, the weight ratio of Fe—Si—Al—Ni—Co series ferromagnetic metal powder (colorant particles) was altered to 30 weight parts; vinyl chloride series resin containing potassium sulfonate (MR-110, manufactured by Nippon Zeon Co., Ltd.) was altered to 6 parts; and polyurethane resin containing sodium sulfonate (UR-8300 manufactured by Toyo Boseki Co., Ltd.) was altered to 6 parts. Content of the colorant particles in the image forming layer 7 was 25.4 wt %.

Image Forming Layer 8

The same as Image Forming Layer 1 except, that in Image Forming Layer 1, the weight ratio of Fe—Si—Al—Ni—Co series ferromagnetic metal powder (colorant particles) was altered to 20 weight parts, vinyl chloride series resin containing potassium sulfonate (MR-110, manufactured by Nippon Zeon Co., Ltd.) was altered to 40 parts, and polyurethane resin containing sodium sulfonate (UR-8300 manufactured by Toyo Boseki Co., Ltd.) was altered to 40 parts. Content of the colorant particles in the image forming layer 8 was 18.5 wt %.

Peelable layer

As the peelable layer, transparent polyethylene terephthalate film (TLOOE manufactured by Diafoil Hoechst Co., Ltd.) with a thickness of 38 µm was employed, and on this peelable layer, an adhesive layer forming coating composition was coated and dried to prepare an adhesive layer with a thickness of 1.0 µm. Next, the surface of the peelable layer provided with this adhesive layer was faced with the surface of an image forming layer and was subjected to pressure treatment employing a pressure roll (at a conveying speed of 30 mm/second and a pressure of 2.0 kg/cm) without no air bubbles involved to prepare an image forming material by coating the image forming layer and peelable layer in this order on a support.

| | |
|---|---|
| Polyurethane resin (Nipporan 3116 manufactured by Nippon Polyurethane Kogyo Co.) | 3.0 parts |
| Fine silicone particles (Tospearl 120 Toshiba Silicone Co., Ltd. | 0.6 part |
| Toluene | 90 parts |
| Cyclohexanone | 6.4 parts |

<Image Forming Method>

A semiconductor laser (LT090MD manufactured by Sharp Co., having a dominant wavelength of 830 nm) was employed and the beam was focused on the interface between the support and the image forming layer, and an image was exposed employing scanning exposure from the support side. Subsequently, image formation was carried out in such a manner that by peeling (at a peeling angle of 1800, and a peeling speed of 30 mm/second) the peelable layer of the above-mentioned image forming material prepared by coating the peelable layer onto the image forming layer, a part, in which a bonding force was decreased due to the image exposure employing high intensity energy light, is transferred to the peelable layer.

The resolving power of the formed image and the residual ratio of the part in which the image forming layer was transfer-removed were evaluated according to the standards mentioned below. Table 1 shows the results.

Confirmation of Magnetic Recording

A magnetic field was applied to the film which had been subjected to image formation employing VSM manufactured by Toei Kogyo Co., and coercive force (Hc), saturated magnetic flux density (Bm), and remanent magnetic flux density (Br) were measured.

Bm is preferably more than 800 Gauss for smooth magnetic recording of simple data such as client's information or image recording information. Bm is more preferably more than 1000 Gauss for good magnetic recording of complicated large volume date such as sound or image.

Sensitivity

Solid scanning exposure was carried out in such a manner that an image in the size of 0.5 mm×0.5 mm was formed employing a beam diameter of 4 µm, and an average exposure amount (E: unit $mJ/cm^2$) onto the surface of an image forming material, in which image formation was carried out, was then subjected to a 5-grade evaluation scale.

5 ... $E \leq 100$

4 ... $100 < E \leq 250$

3 ... $250 < E \leq 400$

2 ... $400 < E \leq 600$

1 ... $600 < E$

Resolving Power

When an image is formed employing scanning exposure having a beam diameter of 4 µm and a scanning pitch of 4 µm, the number (N) of resolved lines was classified according to the 4-grade evaluation scale below.

4 ... $125 \leq N$

3 ... $120 \leq N < 125$

2 ... $110 \leq N < 120$

1 ... $N < 110$

Residual Density

A solid image scanning exposure was carried out so that an image in the size of 5 mm×5 mm was formed employing a beam having a diameter of 4 µm and image exposure was carried out employing high intensity energy light. The transmission density (OD: measured transmission density—transmission density of the support itself) of an image forming material subjected to image formation was measured employing a densitometer (310Tr manufactured by X-rite Co.) under visual density, and was classified according to the 4-grade evaluation scale below.

4 ... $OD \leq 0.060$

3 ... $0.060 < OD \leq 0.100$

2 ... $0.100 < OD \leq 0.250$

1 ... $0.25 < OD$

TABLE 1

| Sample No. | Image Forming Layer | | Density | Sensitivity | Resolving Power | Residual Density | Hc | Bm Gauss | Br Gauss |
| | Type | Thickness µm | | | | | | | |
|---|---|---|---|---|---|---|---|---|---|
| 1 | 1 | 0.5 | 2.1 | 5 | 4 | 3 | 1500 | 3600 | 3240 |
| 2 | 1 | 1 | 4 | 4 | 4 | 4 | 1650 | 3500 | 3150 |
| 3 | 1 | 2 | >6.0 | 3 | 3 | 3 | 1700 | 3600 | 3240 |
| 4 | 1 | 3 | >6.0 | 3 | 3 | 3 | 1720 | 3500 | 3150 |
| 5 | 2 | 0.5 | 0.9 | 5 | 4 | 2 | 570 | 2000 | 1600 |
| 6 | 2 | 1 | 2.7 | 5 | 4 | 3 | 650 | 2000 | 1600 |
| 7 | 2 | 2 | 4.5 | 4 | 3 | 3 | 780 | 2000 | 1600 |
| 8 | 2 | 3 | >6.0 | 3 | 3 | 2 | 780 | 2000 | 1600 |
| 9 | 3 | 0.5 | 2 | 5 | 4 | 3 | 1470 | 3600 | 1800 |
| 10 | 3 | 1 | 3.9 | 4 | 4 | 4 | 1600 | 3500 | 1750 |
| 11 | 3 | 2 | >6.0 | 3 | 3 | 2 | 1670 | 3600 | 1800 |
| 12 | 4 | 1 | 4.1 | 4 | 4 | 4 | 100 | 1100 | 990 |
| 13 | 4 | 2 | >6.0 | 3 | 3 | 3 | 100 | 1000 | 900 |
| 14 | 4 | 3 | >6.0 | 3 | 3 | 3 | 110 | 1000 | 900 |
| 15 | 5 | 0.3 | 1.1 | 5 | 4 | 3 | 1800 | 4200 | 3780 |
| 16 | 5 | 0.5 | 2 | 5 | 4 | 3 | 2100 | 4200 | 3780 |
| 17 | 5 | 1 | 4.1 | 4 | 3 | 4 | 2300 | 4200 | 3780 |
| 20 | 7 | 1 | 1.2 | 4 | 3 | 3 | 1220 | 900 | 810 |

TABLE 1-continued

| Sample No. | Image Forming Layer Type | Thickness μm | Density | Sensitivity | Resolving Power | Residual Density | Hc | Bm Gauss | Br Gauss |
|---|---|---|---|---|---|---|---|---|---|
| 21 | 7 | 2 | 2.5 | 4 | 3 | 3 | 1300 | 900 | 810 |
| 22 | 7 | 3 | 3.4 | 3 | 3 | 3 | 1370 | 900 | 810 |
| 23 | 6 | 1 | 4 | 4 | 4 | 4 | 60 | 500 | 450 |
| 24 | 6 | 2 | >6.0 | 3 | 3 | 3 | 70 | 500 | 450 |
| 25 | 6 | 3 | >6.0 | 3 | 3 | 2 | 80 | 500 | 450 |
| 26 | 7 | 3.5 | 4 | 1 | 1 | 1 | 500 | 600 | 540 |
| 27 | 8 | 0.5 | 0.6 | 4 | 3 | 3 | — | — | — |
| 28 | 8 | 1 | 1 | 4 | 2 | 1 | 300 | 200 | 180 |
| 29 | 8 | 2 | 2.2 | 3 | 1 | 1 | 440 | 200 | 180 |
| 30 | 8 | 3 | 3 | 2 | 1 | 1 | 570 | 200 | 180 |
| 31 | 1 | 3.3 | >6.0 | 1 | 1 | 1 | 1780 | 3600 | 3240 |

Table 1 shows that Samples 23, 24, and 25 employing rant particles having HC not more than 80 Oe exhibits low coercive force and enable no magnetic recording. Samples 28–30, having an imaging forming layer containing colorant particles of less than 20 wt% and samples 26 and 31 having thickness of imaging forming layer more than 3 μm are not sufficient for practical use because of low resolving power and low residual density. On the other hand, Samples 1 through 22 in which colorant particles having Hc of 100 Oe are employed, the content of colorant particles contained in the image forming layer is between 20 and 90 weight percent and the thickness of the image forming layer is between 0.3, and 3.0 μm exhibit commercially viable properties of all the aspects of sensitivity, resolving power, residual density and coercive force.

Example 2

Image forming conditions were recorded by the image forming apparatus shown in FIG. 1, employing Samples prepared in Example 1. Except for Samples 23 through 25, 27, and 32, excellent reproduction of the recording was carried out.

A kind of image data or an accompanying data concerning to the image data etc. are able to be recorded easily and exactly on the ablation material itself and they are able to be recognize later by recording magnetic information by employing ferromagnetic colorant material comprised of non-image-forming area of the image forming layer.

A recording method can be provided which enables to record data effectively and to prevent the peelable layer peeling off during the rotation of the drum in case that the exposed portion of the image forming layer is removed by providing a peelable layer before exposure and releasing the peelable layer after exposure when image is formed by removing the image forming layer at the exposed portion. An image forming layer at the non-image-forming area is effectively employed.

Disclosed embodiment can be varied by a skilled without departing from the spirit and scope of the invention.

What is claimed is:

1. An image forming method comprising steps of;
winding a recording material on a drum, said recording material comprising a support on which is provided (i) an image forming layer which contains colorant particles dispersed into a binder and (ii) a peelable layer, thereafter,
rotating the drum at a circumferential speed of not less than 10 m/sec;
exposing an image forming area of the recording material wound on the drum, with high intensity energy light imagewisely, while the drum rotates at not less than 10 m/sec,
removing the exposed portion of the image forming layer to form an image by releasing the peelable layer, and
recording a magnetic information on the image forming layer at a non image-forming area of the recording material,
wherein (i) the colorant particles are ferromagnetic powder having not less than 100 Oe, (ii) the colorant particles are contained in the image forming layer in an amount of between 20 and 90 weight percent based on the image forming layer, and (iii) the layer thickness of the image forming layer is between 0.1 and 3.0 μm.

2. An image forming method of claim 1 wherein the recording material comprises a protective layer, provided on the image forming layer, having a thickness of 0.05–1.0 μm.

3. An image forming method of claim 1 wherein the recording material comprises a protective layer, provided on the image forming layer, having a surface roughness of 0.1–0.05 μm.

4. An image forming method of claim 1 wherein surface roughness of the recording material is 0.005–0.05 μm.

5. An image forming method of claim 1 wherein the image forming material is prepared by orientation treatment after that coating composition of image forming layer is coated on a support.

* * * * *